J. H. SMITH.
STRAW SPREADER.
APPLICATION FILED APR. 10, 1918. RENEWED OCT. 25, 1919.
1,338,045.
Patented Apr. 27, 1920.
2 SHEETS—SHEET 1.
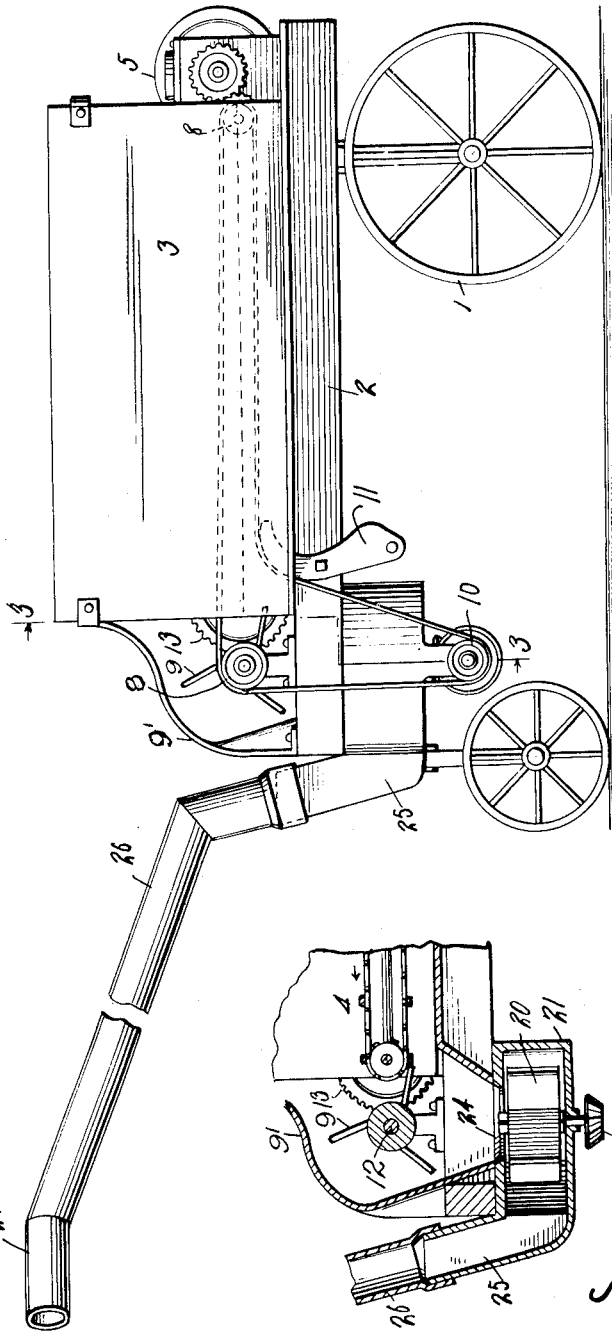
WITNESSES
W. C. Fielding.
INVENTOR
John H. Smith
BY
ATTORNEY

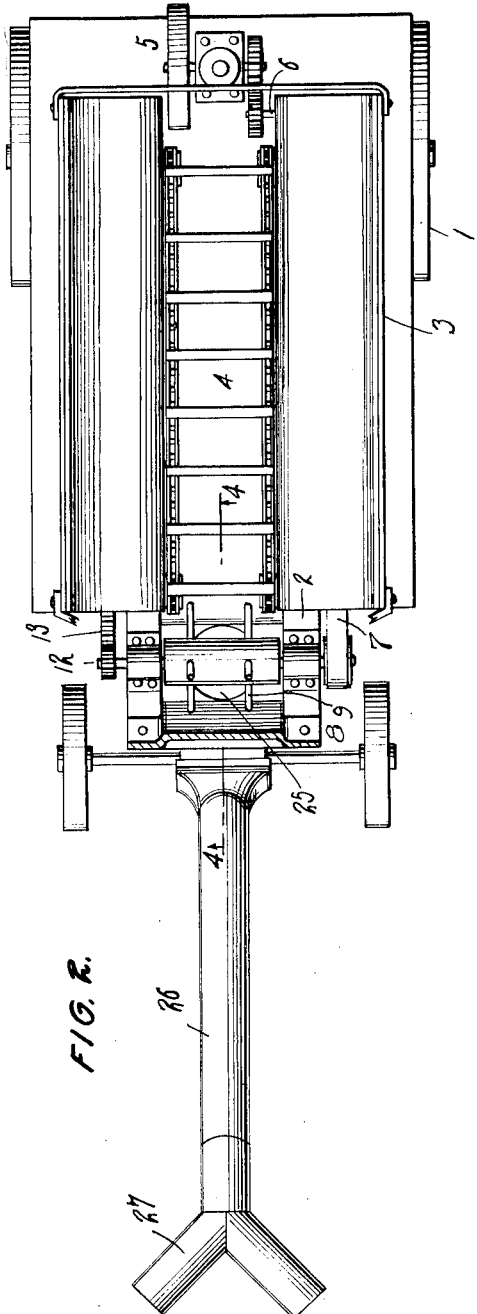
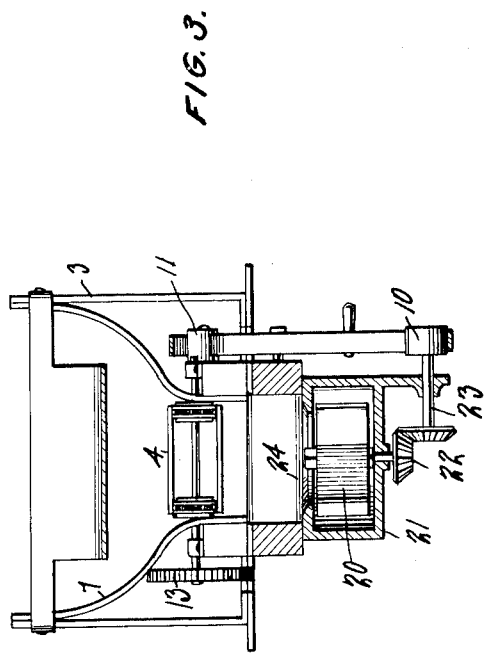

UNITED STATES PATENT OFFICE.

JOHN HENRY SMITH, OF ELLINWOOD, KANSAS.

STRAW-SPREADER.

1,338,045.  Specification of Letters Patent.  Patented Apr. 27, 1920.

Application filed April 10, 1918, Serial No. 227,702. Renewed October 25, 1919. Serial No. 333,369.

*To all whom it may concern:*

Be it known that I, JOHN HENRY SMITH, a citizen of the United States, residing at Ellinwood, in the county of Barton and State of Kansas, have invented certain new and useful Improvements in Straw-Spreaders, of which the following is a specification.

This invention relates to conveyers, and more especially to those which work on the pneumatic principle; and the object of the same is to produce a machine for spreading straw over the earth, rather than burning it as so often occurs. It has been found that straw is a very good fertilizer for some grades of poor earth, and a machine of this kind which can be mounted on an ordinary wagon will therefore serve a useful purpose for the farmer whose land is of that character which needs such fertilizer.

The object of the invention is to produce a simple and inexpensive structure of this kind capable of performing the work cheaply and quickly.

Details are set forth in the following specification, and reference is made to the drawings, wherein:—

Figure 1 is a side elevation and

Fig. 2 a plan view of this machine complete,

Fig. 3 is a cross section on the line 3—3 of Fig. 1, and

Fig. 4 is a longitudinal sectional detail on the line 4—4 of Fig. 2.

The wheels 1 and body 2 may constitute a special support or may be parts of an ordinary farm wagon. On the body is mounted a large hopper consisting of downwardly converging sides 3 suitably supported and braced, and between their lower edges moves an endless conveyer 4 consisting of a pair of chains connected by slats, the chains moving over rollers or sprockets at the extremities of the conveyer as usual. A gasolene engine 5 is mounted on the vehicle, and its power shaft 6 drives a belt 7 which leads over a pulley 8 on a beater 9, thence downward under another pulley 10, thence upward to a belt tightener 11, and back to the power shaft. The beater shaft 12 is connected by gears 13 with one roller or pair of sprockets at the forward end of the conveyer, and as the latter moves forward the beater moves to the rear so that its arms break up the straw into fine particles or pieces.

A suction fan is broadly designated by the numeral 20. This is mounted on an upright shaft within a casing 21, and the shaft is connected by bevel gears 22 with another shaft 23 on which said pulley 10 is mounted. The inlet to the fan casing is indicated at 24 an opening from the bottom of the beater casing 9' and the outlet 25 is through one side of the casing 21 to a tube 26 (which may be detachable or in section or otherwise) and leads eventually to a nozzle 27.

Now when straw is fed into the hopper, it is carried forward by the conveyer, comminuted or broken up by the beater, drawn downward by the suction fan, and delivered through the tube 26 and nozzle 27, and if the latter is at a remote point in the field or on the ground over which the straw is to be spread, it is obvious that the particles thereof will be blown out onto the ground by the fan and will be applied wherever the workman directs the nozzle. While I have shown power as applied to the belt 7 directly from the power shaft 6 of a motor 5 which is mounted on the front of the vehicle, it is quite obvious that if the farmer happens to have another piece of machinery with an engine of its own, it could be belted to this straw spreader instead of having an independent engine as indicated at 5.

Attention is invited to the fact that the beater casing communicates at one side with the outlet end of the hopper and at its bottom with the top of the fan casing, while its two ends are open. In other words, the beater casing is arched over the top of the rotary beater to prevent its arms or blades from tossing the comminuted straw out of the machine before it comes within the field of suction set up by the fan below.

What is claimed as new is:—

In a straw spreader, the combination with a portable support, a motor thereon, a hopper carried by the support and having downwardly converging sides, and an endless conveyer moving along the bottom of said hopper; of a rotary beater at the delivery end of said conveyer, its axis being transverse to the length of the hopper, a beater casing overlying the beater and connected with the ends of the side walls of the hopper, the ends of the beater casing being open, a rotary suction fan whose casing underlies the beater and communicates through its top with the interior of the beater casing, a delivery tube leading from the fan casing, a nozzle at the outer end of said tube, and means for driving the several instrumentalities from the motor.

In testimony whereof I affix my signature in presence of two witnesses.

JOHN HENRY SMITH.

Witnesses:
SAMUEL SMITH, Jr.,
R. C. RUSSELL.